United States Patent
Graif et al.

(10) Patent No.: US 11,327,922 B2
(45) Date of Patent: May 10, 2022

(54) BUS OWNERSHIP FOR A SYSTEM POWER MANAGEMENT INTERFACE (SPMI) BUS

(71) Applicant: QUALCOMM Incorporated, San Diego, CA (US)

(72) Inventors: Sharon Graif, Zichron Yaakov (IL); Sai Ganapathy Srinivasan, Bangalore (IN); Navdeep Mer, Bangalore (IN); Sriharsha Chakka, Bangalore (IN)

(73) Assignee: QUALCOMM Incorporated, San Diego, CA (US)

(*) Notice: Subject to any disclaimer, the term of this patent is extended or adjusted under 35 U.S.C. 154(b) by 0 days.

(21) Appl. No.: 16/997,505

(22) Filed: Aug. 19, 2020

(65) Prior Publication Data

US 2022/0058153 A1 Feb. 24, 2022

(51) Int. Cl.
*G06F 13/42* (2006.01)
*G06F 13/40* (2006.01)
*G06F 1/08* (2006.01)

(52) U.S. Cl.
CPC ............ *G06F 13/4291* (2013.01); *G06F 1/08* (2013.01); *G06F 13/409* (2013.01); *G06F 13/4031* (2013.01); *G06F 13/4068* (2013.01)

(58) Field of Classification Search
CPC .... G06F 13/4291; G06F 1/08; G06F 13/4031; G06F 13/4068; G06F 13/409
See application file for complete search history.

(56) References Cited

U.S. PATENT DOCUMENTS

| | | | |
|---|---|---|---|
| 2002/0125927 A1* | 9/2002 | Hofstra | G06F 1/10 327/158 |
| 2004/0123005 A1* | 6/2004 | Stuber | G06F 13/37 710/107 |
| 2007/0124558 A1* | 5/2007 | Lee | G06F 13/362 711/167 |
| 2009/0085631 A1* | 4/2009 | Lambrecht | G06F 13/4291 327/299 |
| 2011/0153900 A1* | 6/2011 | Zitlaw | G06F 13/1689 710/313 |
| 2016/0337741 A1* | 11/2016 | Amarilio | G06F 3/162 |
| 2017/0199839 A1* | 7/2017 | Mishra | G06F 13/364 |
| 2017/0212850 A1 | 7/2017 | Mishra et al. | |
| 2019/0155781 A1* | 5/2019 | Amarilio | G06F 13/362 |

* cited by examiner

*Primary Examiner* — Phong H Dang
(74) *Attorney, Agent, or Firm* — Qualcomm Incorporated

(57) ABSTRACT

The systems and methods for bus ownership in a system power management interface (SPMI) bus may include two or more masters on the SPMI bus, and bus ownership may be passed between masters. The current owner of the bus is responsible for providing a clock signal on the clock line of the SPMI bus. To avoid problems caused by ringing of the clock signal being sent on a conductor that exceeds the SPMI specification, the original master (from whom bus ownership is being transferred) holds the clock line of the SPMI bus at a logical low for a clock delay value that is based on conductor length.

26 Claims, 7 Drawing Sheets

US 11,327,922 B2

BUS OWNERSHIP FOR A SYSTEM POWER MANAGEMENT INTERFACE (SPMI) BUS

BACKGROUND

I. Field of the Disclosure

The technology of the disclosure relates generally to bus ownership and particularly to handling transfers of bus ownership in a system power management interface (SPMI) bus.

II. Background

Computing devices abound in modern society. The proliferation of computing devices is at least in part attributable to the rise of mobile computing devices such as smart phones. Computing devices frequently rely on different specialized integrated circuits (ICs) that perform specific functions for the computing devices. When more than one IC is present, there must be an accepted protocol or standard through which the ICs may communicate with one another. Much as the ICs may be specialized in the tasks that they are capable of performing so too have specialized protocols been created. One such protocol is the system power management interface (SPMI) put forth by the MIPI Alliance.

SUMMARY OF THE DISCLOSURE

Aspects disclosed in the detailed description include systems and methods for bus ownership in a system power management interface (Sinn) bus. In particular, when there are two or more masters on the SPMI bus, bus ownership may be passed between the masters. The current owner of the SPMI bus is responsible for providing a clock signal on a clock line of the SPMI bus. To avoid problems caused by ringing of the clock signal being sent on a conductor that exceeds the SPMI specification, the original master (from whom bus ownership is being transferred) holds the clock line of the SPMI bus at a logical low for a clock delay value that is based on conductor length.

In this regard in one aspect, an integrated circuit (IC) is disclosed. The IC includes a bus interface coupled to a two-wire bus. The IC also includes a memory element including a configuration table. The IC also includes a control circuit coupled to the bus interface and the memory element. The control circuit is configured to, while having ownership of the two-wire bus, determine a clock delay value by reference to the configuration table. The control circuit is also configured to, at a bus ownership transfer, hold a clock line of the two-wire bus at a logical low for the clock delay value.

In another aspect, a power system is disclosed. The power system includes a two-wire bus. The power system also includes a first IC. The first IC includes a first bus interface coupled to the two-wire bus. The first IC also includes a first memory element including a first configuration table. The first IC also includes a first control circuit coupled to the first bus interface and the first memory element. The first control circuit is configured to, while having ownership of the two-wire bus, determine a first clock delay value by reference to the first configuration table. The first control circuit is also configured to, at a bus ownership transfer, hold a clock line of the two-wire bus at a logical low for the clock delay value. The power system also includes a second IC. The second IC includes a second bus interface coupled to the two-wire bus. The second IC also includes a second memory element including a second configuration table. The second IC also includes a second control circuit coupled to the second bus interface and the second memory element. The second control circuit is configured, responsive to a bus ownership command, to, after expiration of the clock delay value, assume ownership of the bus. The control circuit is also configured to drive the clock line with a clock signal.

In another aspect, a method for controlling a change of masters on a two-wire bus is disclosed. The method includes, responsive to receiving a change in master command, at a new master identified by the change in master command, referring to a configuration table to determine a clock delay value. The method also includes holding a clock line of the two-wire bus for the clock delay value.

DETAILED DESCRIPTION

Figure 1:
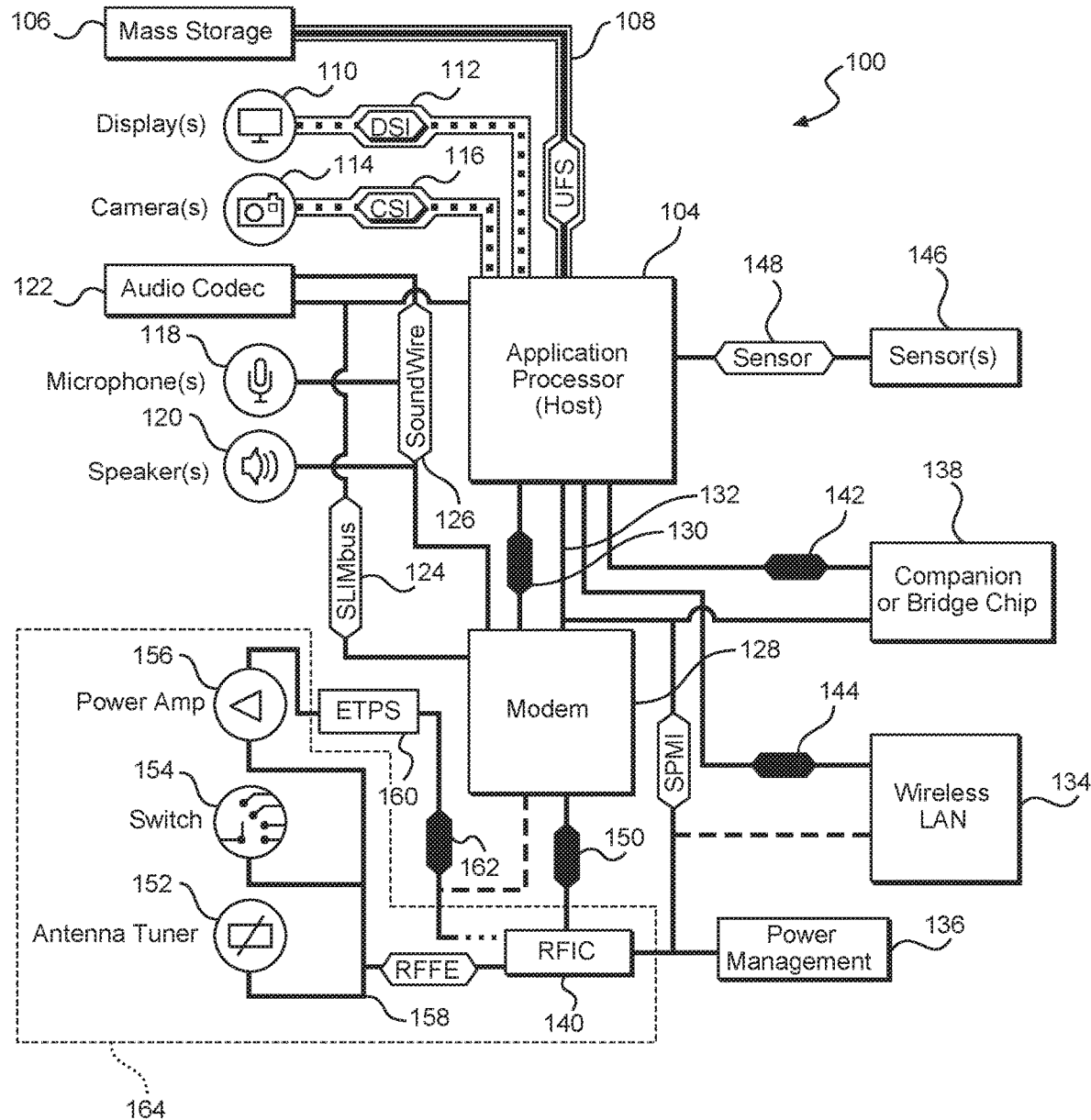
FIG. 1 is a block diagram of an exemplary computing device with associated buses therein including a system power management interface (SPMI) bus.

With reference now to the drawing figures, several exemplary aspects of the present disclosure are described. The word "exemplary" is used herein to mean "serving as an example, instance, or illustration." Any aspect described herein as "exemplary" is not necessarily to be construed as preferred or advantageous over other aspects.

Aspects disclosed in the detailed description include systems and methods for bus ownership in a system power management interface (SPMI) bus. In particular, when there are two or more masters on the SPMI bus, bus ownership may be passed between the masters. The current owner of the SPMI bus is responsible for providing a clock signal on a clock line of the SPMI bus. To avoid problems caused by ringing of the clock signal being sent on a conductor that exceeds the SPMI specification, the original master (from whom bus ownership is being transferred) holds the clock line of the SPMI bus at a logical low for a clock delay value that is based on conductor length.

In this regard, FIG. 1 is a system-level block diagram of an exemplary mobile terminal 100 such as a smart phone, mobile computing device tablet, or the like. While a mobile terminal having an SPMI bus is particularly contemplated as being capable of benefiting from exemplary aspects of the present disclosure, it should be appreciated that the present disclosure is not so limited and may be useful in other busses such as a Radio Frequency Front End (RFFE) bus.

With continued reference to FIG. 1, the mobile terminal 100 includes an application processor 104 (sometimes referred to as a host) that communicates with a mass storage element 106 through a universal flash storage (UFS) bus 108. The application processor 104 may further be connected to a display 110 through a display serial interface (DSI) bus 112 and a camera 114 through a camera serial interface (CST) bus 116. Various audio elements such as a microphone 118, a speaker 120, and an audio codec 122 may be coupled to the application processor 104 through a serial low-power interchip multimedia bus (SLIMbus) 124. Additionally, the audio elements may communicate with each other through a SOUNDWIRE bus 126. A modem 128 may also be coupled to the SLIMbus 124 and/or the SOUND-WIRE bus 126. The modem 128 may further be connected to the application processor 104 through a peripheral component interconnect (PCI) or PCI express (PCIe) bus 130 and/or an SPMI bus 132. The SPMI bus 132 may be a two-wire bus including a clock line and a data line (not illustrated in FIG. 1).

With continued reference to FIG. 1, the SPMI bus 132 may also be coupled to a local area network (LAN or WLAN) integrated circuit (IC) (LAN IC or WLAN IC) 134, a power management integrated circuit (PMIC) 136, a companion IC (sometimes referred to as a bridge chip) 138, and a radio frequency IC (RFIC) 140. In exemplary aspects, one or more of these ICs may be masters or slaves. It should be appreciated that separate PCI buses 142 and 144 may also couple the application processor 104 to the companion IC 138 and the WLAN IC 134. The application processor 104 may further be connected to sensors 146 through a sensor bus 148. The modem 128 and the RFIC 140 may communicate using a bus 150.

With continued reference to FIG. 1, the RFIC 140 may couple to one or more RFFE elements, such as an antenna tuner 152, a switch 154, and a power amplifier 156 through an RFFE bus 158. Additionally, the RFIC 140 may couple to an envelope tracking power supply (ETPS) 160 through a bus 162, and the ETPS 160 may communicate with the power amplifier 156. Collectively, the RFFE elements, including the RFIC 140, may be considered an RFFE system 164. It should be appreciated that the RFFE bus 158 may be a two-wire bus formed from a clock line and a data line (not illustrated).

Figure 2:
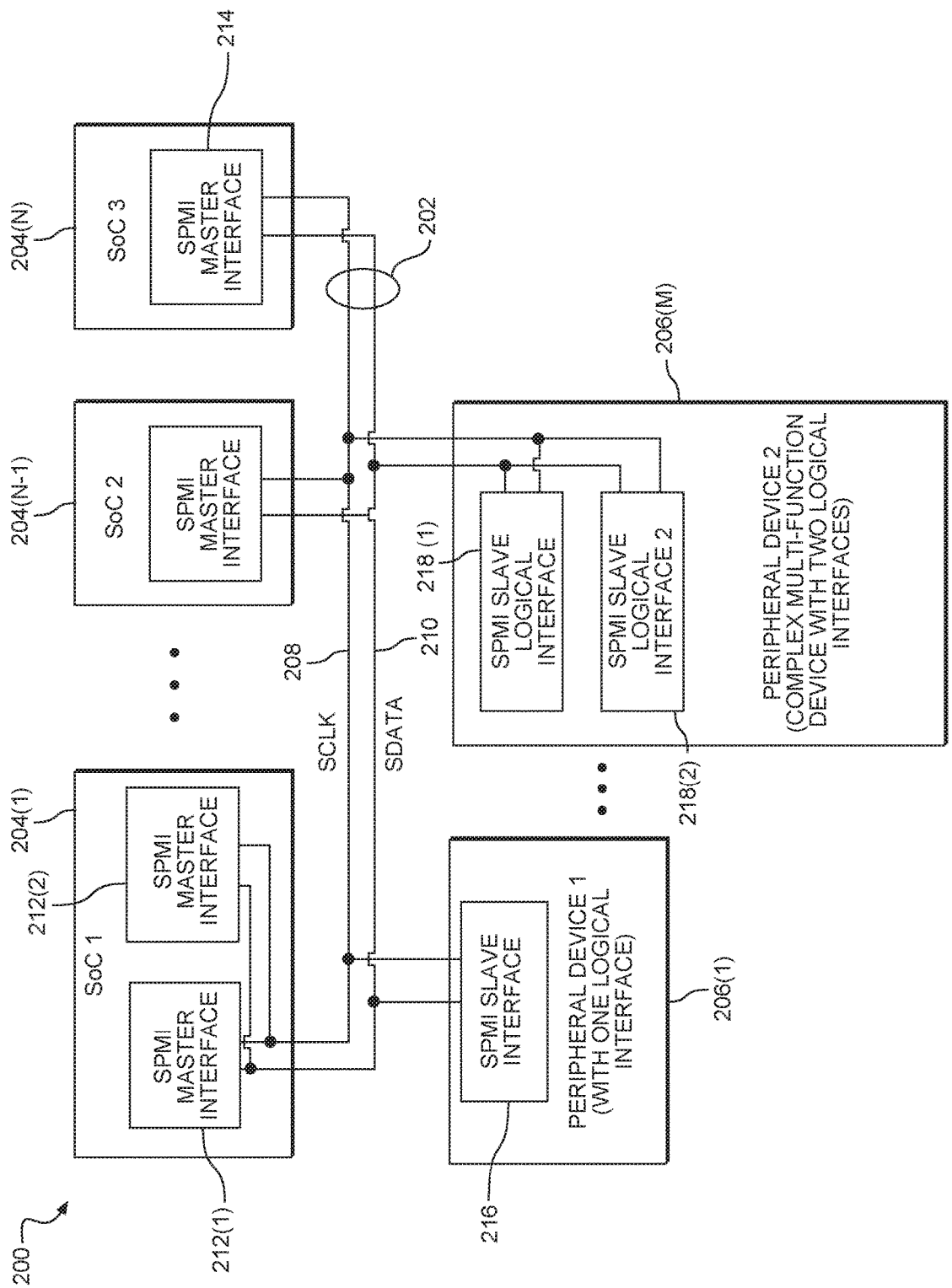
FIG. 2 is a block diagram of an SPMI subsystem having multiple masters and multiple slaves attached to an SPMI bus.

As noted, exemplary aspects of the present disclosure are well suited for use with a power system within a mobile terminal having an SPMI bus. While the present disclosure is not limited to such a power system, for the purposes of illustration an SPMI subsystem is used to explore the bus ownership techniques of the present disclosure. In this regard, FIG. 2 is a block diagram of an SPMI subsystem 200 (sometimes referred to simply as a power system) having multiple masters and multiple slaves attached to a two-wire SPMI bus 202 (sometimes just referred to as a two-wire bus), which may be the SPMI bus 132 of FIG. 1. In this regard, the SPMI subsystem 200 includes a plurality of masters 204(1)-204(N) and a plurality of slaves 206(1)-206(M). As illustrated, N=3 and M=2, but it should be appreciated that the SPM standard allows up to four masters 204 and up to sixteen slaves 206. The SPMI bus 202 may include a clock line 208 and a data line 210 (also referred as SCLK and SDATA, respectively, in FIG. 2). A given master 204(1) may have multiple (in this case two) SPMI interfaces 212(1)-212(2) coupled to the SPMI bus 202. More commonly, a master such as master 204(N) may have a single SPMI interface 214 coupled to the SPMI bus 202. Similarly, a slave such as slave 206(1) may have a single SPMI interface 216 and a slave such as slave 206(M) may have multiple (in this case two) SPMI interfaces 218(1)-218(2).

Figure 3:
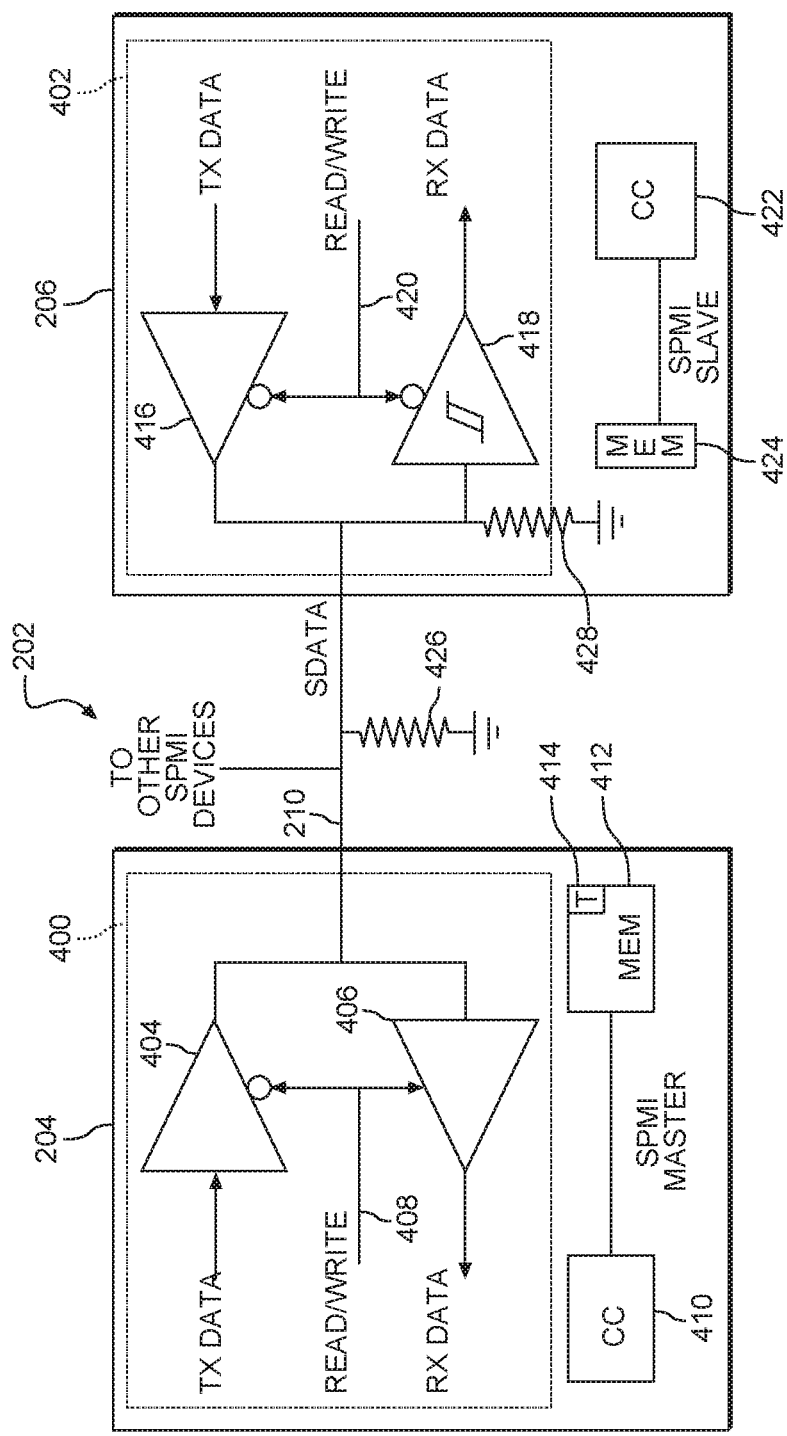
FIG. 3 is a schematic diagram of the input/output requirements for a data line of an SPMI bus for a master and a slave.

FIG. 3 is a schematic diagram of the input/output requirements for the data line 210 of the SPMI bus 202 for a master 204 and a slave 206. In particular, a bus interface 400 for the master 204 is illustrated along with a bus interface 402 for the slave 206. The bus interface 400 includes a data out amplifier 404 that sends data on the data line 210 and a data in amplifier 406 that amplifies incoming signals received on the data line 210. The data out/in amplifiers 404, 406 are toggled by a read/write or data in enable signal 408. The master 204 may further include a control circuit 410 (sometimes referred to as CC in the drawings) and a memory element 412 (sometimes referred to as MEM in the drawings) in which a configuration table 414 (sometimes referred to as T in the drawings) is stored.

The bus interface 402 includes a data out amplifier 416 that sends data on the data line 210 and a data in amplifier 418 that amplifies incoming signals received on the data line 210. The data out/in amplifiers 416, 418 are toggled by a read/write or data in enable signal 420. The slave 206 may further include a control circuit 422 (sometimes referred to as CC in the drawings) and a memory element 424 (sometimes referred to as MEM in the drawings). Additional pull-down resistors 426 and 428 may be associated with the data line 210 to help provide a logical low when desired. Note that both, one, or neither of the pull-down resistors 426, 428 may be present.

Figure 4:
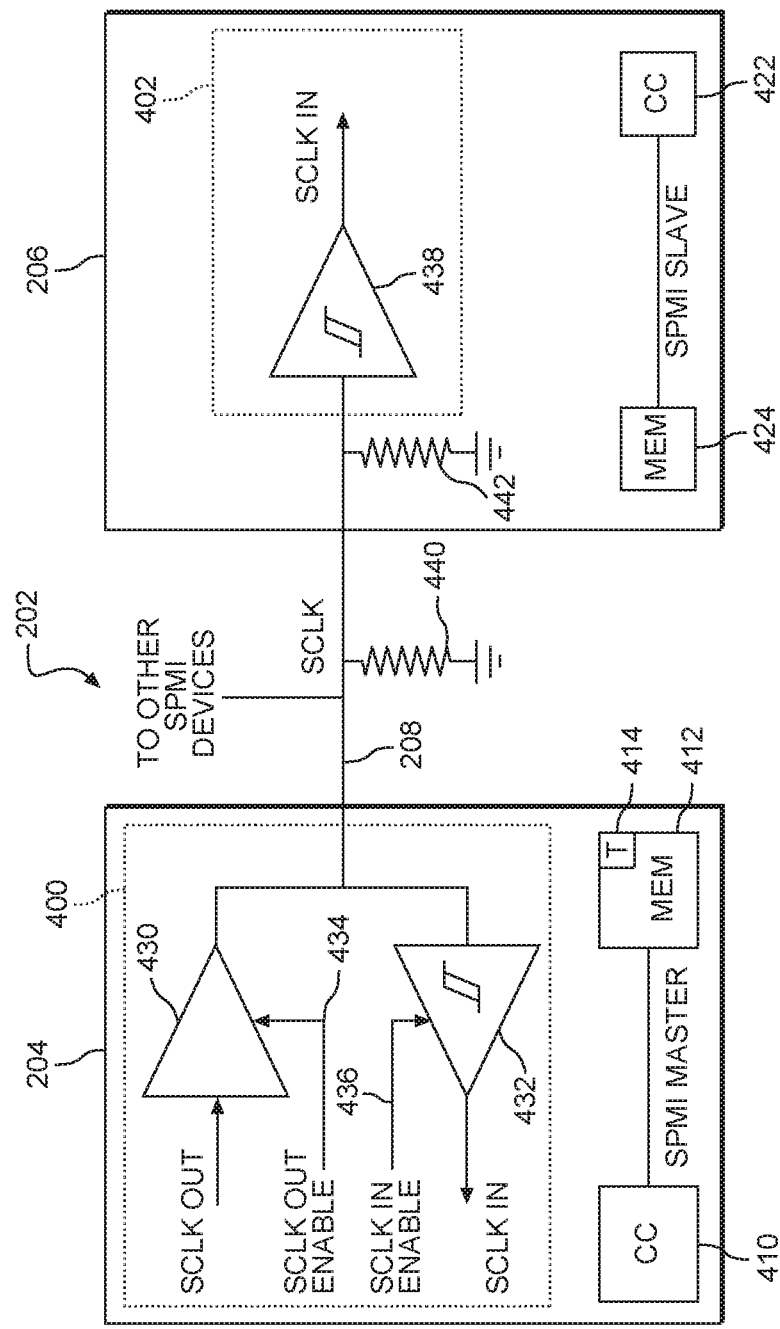
FIG. 4 is a schematic diagram of the input/output requirements for a clock line of an SPMI bus for a master and a slave.

Similarly, FIG. 4 is a schematic diagram of the input/output requirements for the clock line 208 of the SPMI bus 202 for the master 204 and the slave 206. In particular, the bus interface 400 for the master 204 is illustrated along with the bus interface 402 for the slave 206. The bus interface 400 includes a dock out amplifier 430 that sends a clock signal on the clock line 208 and a clock in amplifier 432 that amplifies incoming signals received on the dock line 208 (including any reflections). The clock out amplifier 430 is enabled by a clock out enable (SCLK OUT ENABLE_signal 434, while the clock in amplifier 432 is enabled by a clock in enable (SCLK IN ENABLE) signal 436.

The bus interface 402 includes a clock in amplifier 438 that amplifies incoming signals received on the clock line 208. Additional pull-down resistors 440 and 442 may be associated with the clock line 208 to help provide a logical low when desired. Note that both, one, or neither of the pull-down resistors 440, 442 may be present.

Figure 5:
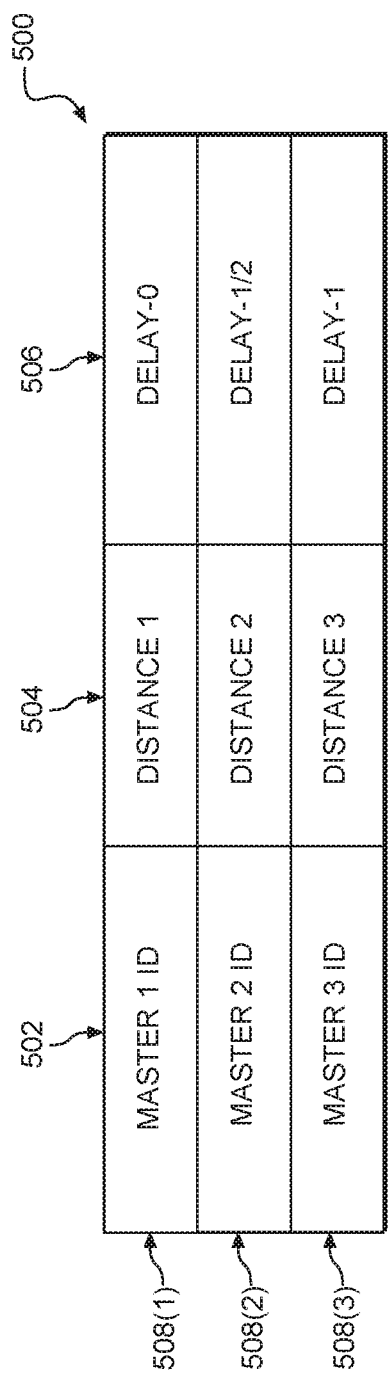
FIG. 5 is an exemplary configuration table that may be stored in memory of a master associated with an SPMI bus.

FIG. 5 is an exemplary configuration table 500 (equivalent to the configuration table 414 of FIG. 3) that may be stored in the memory element 412 of FIG. 3. In particular, the configuration table 500 may include a master identification (ID) column 502, a distance column 504, and a delay value column 506 with rows 508(1)-508(3) corresponding to the other masters 204(1)-204(4). For example, if the configuration table 500 is within the master 204(1), then the entries in the master ID column 502 correspond to an address or other identification of the masters 204(2)-204(4) or if the configuration table 500 is within the master 204(4), then the entries correspond to the masters 204(1)-204(3), etc. Entries in the distance column 504 indicate a distance between different ones of the masters 204(1)-204(4). Thus, if the configuration table 500 is for the master 204(4), then the entries in the distance column 504 are the distances to the respective masters 204(1)-204(3). The delay value column 506 includes respective delay values based on the corresponding distance identified in the distance column 504. Note that a distance may be determined during manufacture or at some other time and the delay value programmed into the configuration table 500 without putting an explicit value of the distance in the configuration table 500. Thus, the distance column 504 may be omitted if desired. Entries in the delay value column 506 tell the control circuit 410 of a master 204 (that has been the bus owner but lost an arbitration to another master to transfer bus ownership) how long to hold the clock signal to reduce ringing on the clock line 208. In an exemplary aspect, delays may be no delay, a half clock cycle delay, or a full clock cycle delay. Greater delays may be used if the distances are sufficiently long. Note that the SPMI standard indicates that an SPMI bus should be less than fifteen centimeters (15 cm) between the furthest points. However, as SPMI is adapted to new devices (such as automobiles), distances of greater than 15 cm may be required, resulting in greater ringing.

Absent the present disclosure, the bus may "ring" when there is a transfer of bus ownership such as during a bus ownership master (BOM) transfer command or a transfer bus owner (TBO) command. That is, a clock signal from a first transmitting master is free to travel the entire length of the bus. When the clock signal reaches the end of the clock line, the clock signal bounces back and travels back up the clock line. The bounced signal may destructively interfere with a new clock signal being sent on the clock line. Such ringing and consequent interference during bus ownership transfers may cause an incorrect master priority level (MPL) calculation, which may lead to both masters concluding that they are the bus owner, which in turn will lead to bus contentions.

Exemplary aspects of the present disclosure help suppress ringing on the clock line during bus ownership transfers to help avoid bus contentions and specifically accommodate ringing that may occur on buses greater than 15 cm long. When a bus ownership transfer is occurring, the master that was the BOM, but is transferring ownership, will consult its internal configuration table and select the delay value therefrom corresponding to the new master. The old master will hold the clock line at a logical low until the ringing has stopped, and the new master will delay activating a clock out signal on the clock line of the bus. This delay will allow any ringing present on the clock line to finish before the new master begins to send a clock signal on the clock line.

Figure 6:
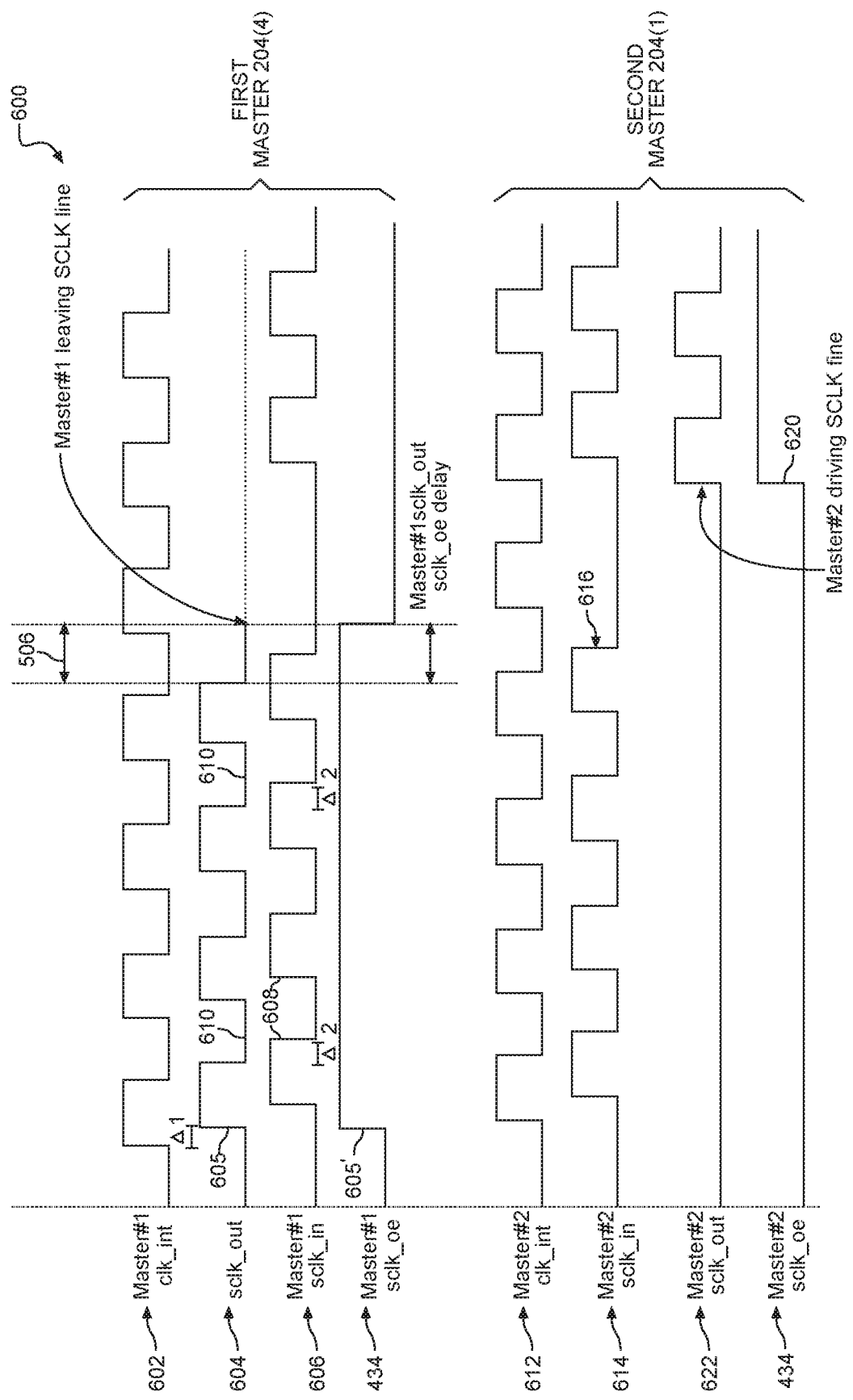
FIG. 6 is a signal diagram showing delays implemented by a master of an SPMI bus after consultation with the configuration table of FIG. 5.

In this regard, FIG. 6 is a signal diagram 600 showing delays implemented by a first master 204(4) using the configuration table 500 of FIG. 5 while handing off BOM to a second master 204(1). An exemplary internal clock signal 602 (also referred to as clk_int) is provided. This internal clock signal 602 may be provided by a system clock (not shown), some crystal oscillator, or some other clock source within the master 204(4). The internal clock signal 602 should be stable and is not modified by the present disclosure. Signals derived from the internal clock signal 602 may be modified as set forth herein. A clock out signal 604 (sclk_out) is generated from the internal clock signal 602 and is delayed by a value from the configuration table 500. As illustrated, that value is Δ1 as shown between a rising edge of the internal clock signal 602 and a rising edge of the clock out signal 604. Note that the clock out signal 604 is not actually put on the clock line 208 until the clock out amplifier 430 is enabled by the SCLK OUT ENABLE signal 434. As illustrated, the first rising edge 605 of the clock out signal 604 corresponds to the time 605' when the SCLK OUT ENABLE signal 434 enables the clock out amplifier 430. The clock out signal 604 will reflect from an end of a conductor that is the clock line 208 and come back to the master as a clock in signal 606. The clock in signal 606 may be at a logical high 608 for a time Δ2 overlapping when the clock out signal 604 is at a logical low 610. This overlap may cause destructive interference of the clock out signal 604.

Concurrently, the second master (in this example master 204(1)) has its own internal clock signal 612, which again may be provided by a system clock (not shown), some crystal oscillator, or some other source within the master 204(1). The internal clock signal 612 should be stable and is not modified by the present disclosure. The second master 204(1) receives a clock in signal 614, which until time 616 comes from the first master 204(4) based on the clock out signal 604 from the first master 204(4). It should be appreciated that a distance between the first master 204(4) and the second master 204(1) will cause some delay between when the clock out signal 604 is sent and when it is received at the second master 204(1). While the first master 204(4) is the BOM, the second master 204(1) does not generate a clock out signal 622 because the SCLK OUT ENABLE signal 434' of the second master 204(1) is not at a logical high (i.e., enabled).

As shown by the dotted lines showing the delay 506, the first master 204(4) keeps the clock line 208 at a logical low by the amount of the delay 506. Sometime after the delay 506 has expired, the second master 204(1) enables the clock out by transitioning the SCLK OUT ENABLE signal 434' (see at time 620) and begins providing the clock out signal 622 on the clock line 208.

Figure 7:
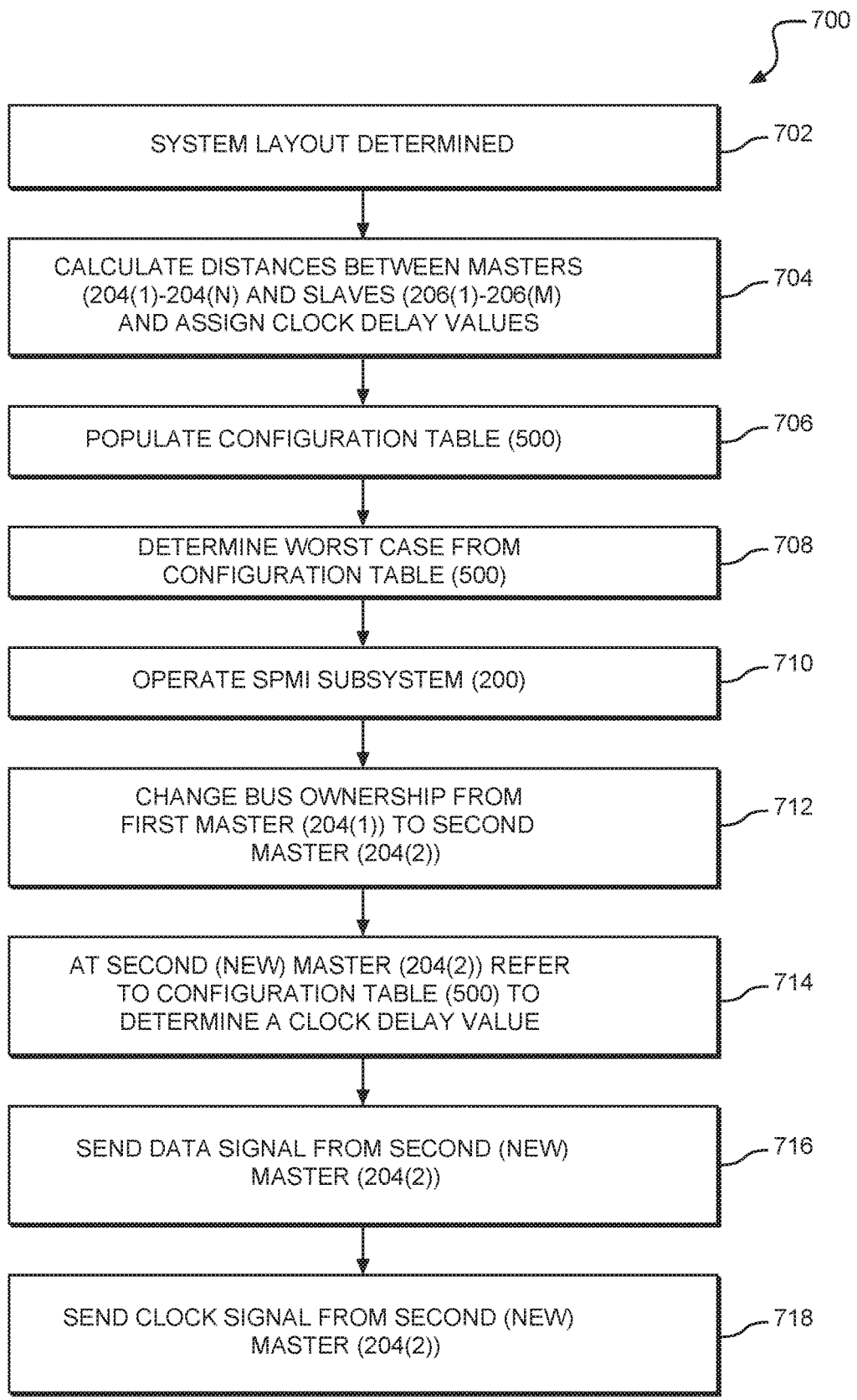
FIG. 7 is a flowchart illustrating an exemplary process for handling bus ownership transfers in conjunction with delays from the configuration table of FIG. 5.

FIG. 7 is a flowchart illustrating an exemplary process 700 for handling bus ownership transfers in conjunction with delays from the configuration table 500 of FIG. 5. In this regard, the process 700 starts with a system layout being determined (block 702). During system layout, distances between masters 204(1)-204(N) and slaves 206(1)-206(M) are calculated and clock delay values assigned based on the distances (block 704). A configuration table 500 is then populated (block 706). From the populated configuration table 500, a worst case is determined (block 708). That is, the largest delay value may correspond to the worst case.

In use, the SPMI subsystem 200 is operated (block 710). At some point, there is a change in bus ownership from a first master 204(1) to a second master 204(2) (block 712). This change may originate from a BOM transfer or a TBO command or the like. The first master 204(1) may hold the clock line 208 at a logical low to help reduce ringing. The duration of this hold may be based on the configuration table 500. At the second (or new) master 204(2), the control circuit may refer to the configuration table 500 to determine a clock delay value (block 714). The second (or new) master 204(2) may send a data signal (block 716) and send a clock signal (block 718) delayed relative to internal clock signal by the clock delay value.

The systems and methods for bus ownership in an SPMI bus according to aspects disclosed herein may be provided in or integrated into any processor-based device. Examples, without limitation, include a set top box, an entertainment unit, a navigation device, a communications device, a fixed location data unit, a mobile location data unit, a global positioning system (GPS) device, a mobile phone, a cellular phone, a smart phone, a session initiation protocol (SIP) phone, a tablet, a phablet, a server, a computer, a portable computer, a mobile computing device, a wearable computing device (e.g., a smart watch, a health or fitness tracker, eyewear, etc.), a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, a portable digital video player, an automobile, a vehicle component, avionics systems, a drone, and a multicopter.

Those of skill in the art will further appreciate that the various illustrative logical blocks, modules, circuits, and algorithms described in connection with the aspects disclosed herein may be implemented as electronic hardware, instructions stored in memory or in another computer readable medium and executed by a processor or other processing device, or combinations of both. The devices described herein may be employed in any circuit, hardware component, IC, or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The aspects disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flowchart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations. Thus, the disclosure is not intended to be limited to the examples and designs described herein, but is to be accorded the widest scope consistent with the principles and novel features disclosed herein.

What is claimed is:

1. An integrated circuit (IC) comprising:
   a bus interface coupled to a two-wire bus;
   a memory dement comprising a configuration table comprising delay values based on conductor lengths of the two-wire bus; and
   a control circuit coupled to the bus interface and the memory element, the control circuit configured to:
   while having ownership of the two-wire bus, determine a dock delay value by reference to the configuration table, wherein the clock delay value is based on a worst-case conductor length having a largest delay value;
   at a bus ownership transfer, hold a dock line of the two-wire bus at a logical low for the clock delay value; and
   receive a new clock signal on the clock line from a remote IC at expiration of the clock delay value.

2. The IC of claim 1, wherein the bus interface comprises a system power management interface (SPMI) bus interface.

3. The IC of claim 1, wherein the bus interface comprises a clock out amplifier.

4. The IC of claim 3, wherein the clock out amplifier is configured to receive a clock out enable signal from the control circuit.

5. The IC of claim 1, wherein the bus interface comprises a clock in amplifier.

6. The IC of claim 5, wherein the clock in amplifier is configured to receive a clock in enable signal from the control circuit.

7. The IC of claim 1, wherein the control circuit is configured to determine the clock delay value by reference to the configuration table responsive to a bus ownership master (BOM) transfer command.

8. The IC of claim 1, wherein the control circuit is configured to determine the clock delay value by reference to the configuration table responsive to a transfer bus owner (TB 0) command.

9. The IC of claim 1, wherein the clock delay value causes a clock signal to be held low to mask ringing from a clock_in signal.

10. The IC of claim 1 integrated into a device selected from the group consisting of: a set top box; an entertainment unit; a navigation device; a communications device; a fixed location data unit; a mobile location data unit; a global positioning system (GPS) device; a mobile phone; a cellular phone; a smart phone; a session initiation protocol (SIP) phone; a tablet; a phablet; a server; a computer; a portable computer; a mobile computing device; a wearable computing device; a desktop computer; a personal digital assistant (PDA); a monitor; a computer monitor; a television; a tuner; a radio; a satellite radio; a music player; a digital music player; a portable music player; a digital video player; a video player; a digital video disc (DVD) player; a portable digital video player; an automobile; a vehicle component; avionics systems; a drone; and a multicopter.

11. A power system comprising:
a two-wire bus;
a first integrated circuit (IC) comprising:
  a first bus interface coupled to the two-wire bus;
  a first memory element comprising a first configuration table comprising delay values based on conductor lengths of the two-wire bus; and
  a first control circuit coupled to the first bus interface and the first memory element, the first control circuit configured to:
  while having ownership of the two-wire bus, determine a clock delay value by reference to the first configuration table, wherein the clock delay value is based on a worst-case conductor length having a largest delay value; and
  at a bus ownership transfer, hold a clock line of the two-wire bus at a logical low for the clock delay value; and
a second IC comprising:
  a second bus interface coupled to the two-wire bus;
  a second memory element comprising a second configuration table; and
  a second control circuit coupled to the second bus interface and the second memory element, the second control circuit configured, responsive to a bus ownership command, to:
  after expiration of the clock delay value, assume ownership of the two-wire bus; and
  drive the clock line with a new clock signal concurrently with assumption of ownership of the two-wire bus.

12. The power system of claim 11, wherein the clock line of the two-wire bus exceeds fifteen centimeters (15 cm).

13. The power system of claim 11 integrated into an automobile.

14. The power system of claim 11, wherein the first control circuit is configured to determine the clock delay value by reference to the first configuration table responsive to a bus ownership master (BOM) transfer command.

15. The power system of claim 11, wherein the first control circuit is configured to determine the clock delay value by reference to the first configuration table responsive to a transfer bus owner (TBO) command.

16. The power system of claim 11, wherein the two-wire bus comprises a system power management interface (SPMI) bus.

17. The power system of claim 11, wherein the clock delay value causes a clock signal to be held low to mask ringing from a clock_in signal.

18. The power system of claim 11, wherein the two-wire bus is longer than fifteen centimeters (15 cm).

19. A method for controlling a change of masters on a two-wire bus, the method comprising:
responsive to receiving a change in master command:
  at a first master that had ownership of the two-wire bus, referring to a configuration table comprising delay values based on conductor lengths of the two-wire bus to determine a dock delay value, wherein the dock delay value is based on a worst-case conductor length having a largest delay value;
  holding a clock line of the two-wire bus at a logical low for the clock delay value; and
  receiving a new clock signal on the clock line from a remote IC at expiration of the clock delay value.

20. The method of claim 19, wherein the two-wire bus comprises a system power management interface (SPMI) bus.

21. The method of claim 19, further comprising receiving at the first master, the change in master command.

22. The method of claim 19, wherein the change in master command comprises a transfer bus owner (TBO) command.

23. The method of claim 19, wherein the change in master command comprises a bus ownership master (BOM) transfer command.

24. The method of claim 19, further comprising populating the configuration table.

25. The method of claim 24, wherein populating the configuration table comprises determining a distance of the clock line of the two-wire bus from the first master to a new master.

26. The method of claim 25, further comprising determining the clock delay value based on the distance.

* * * * *